Figure 2:
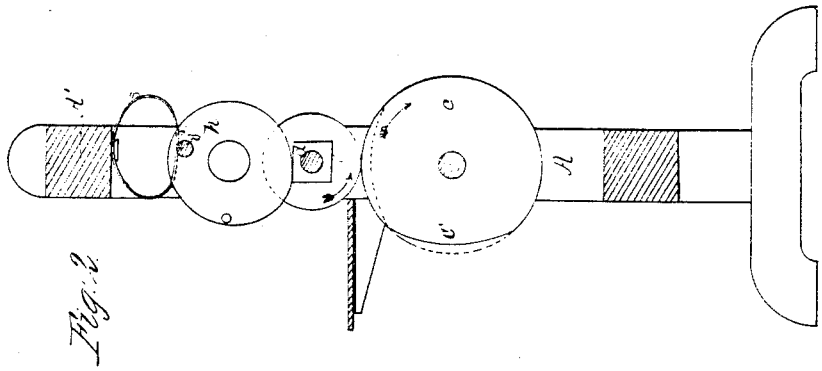
Figure 1:
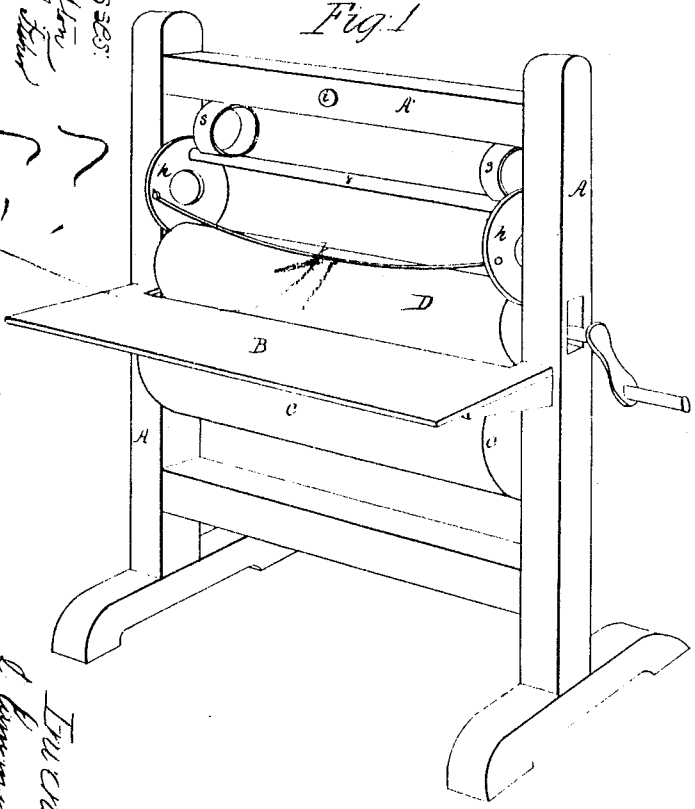

No Printed Specification Available

D. Cumming Jr.

Mangle,

BEST AVAILABLE COPY

A. I No. 234.

A. I May 3. 1859.

Witnesses:
H. Clifton
Charles L. Fisher

Inventor
D. Cumming Jr.

N. PETERS PHOTO-LITHOGRAPHER, WASHINGTON, D. C.